(12) United States Patent
Mochizuki

(10) Patent No.: US 8,408,561 B2
(45) Date of Patent: Apr. 2, 2013

(54) VEHICLE HEIGHT ADJUSTING DEVICE

(75) Inventor: Takahisa Mochizuki, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 64 days.

(21) Appl. No.: 12/994,178

(22) PCT Filed: Dec. 24, 2009

(86) PCT No.: PCT/JP2009/071862
§ 371 (c)(1),
(2), (4) Date: Nov. 23, 2010

(87) PCT Pub. No.: WO2010/074322
PCT Pub. Date: Jul. 1, 2010

(65) Prior Publication Data
US 2011/0101632 A1 May 5, 2011

(30) Foreign Application Priority Data

Dec. 24, 2008 (JP) .................................. 2008-326955
Dec. 24, 2008 (JP) .................................. 2008-326956
Dec. 24, 2008 (JP) .................................. 2008-326957
Dec. 24, 2008 (JP) .................................. 2008-326958

(51) Int. Cl.
*B60G 17/044* (2006.01)
*B60G 15/06* (2006.01)

(52) U.S. Cl. ............... 280/5.514; 267/64.17; 280/6.157; 280/124.154; 280/124.16; 280/124.162

(58) Field of Classification Search .................... 92/136; 267/34, 64.16, 64.17, 195, 220, 221; 280/5.514, 280/6.157, 124.145, 124.146, 124.154, 124.157, 280/124.16–124.162; 417/410.1, 415
See application file for complete search history.

(56) References Cited

U.S. PATENT DOCUMENTS

| 2,887,324 | A | * | 5/1959 | Jackson | 280/6.159 |
| 2,904,343 | A | * | 9/1959 | Taber | 280/43.18 |
| 2,923,557 | A | * | 2/1960 | Schilling et al. | 280/6.158 |
| 3,409,286 | A | * | 11/1968 | Erdmann | 267/64.17 |
| 3,527,467 | A | * | 9/1970 | Scott et al. | 280/5.503 |
| 4,159,105 | A | * | 6/1979 | Vander Laan et al. | 267/218 |

(Continued)

FOREIGN PATENT DOCUMENTS

| JP | 11-514722 T | 12/1999 |
| JP | 2001-088528 A | 4/2001 |

(Continued)

*Primary Examiner* — Paul N Dickson
*Assistant Examiner* — Laura Freedman
(74) *Attorney, Agent, or Firm* — Rabin & Berdo, P.C.

(57) ABSTRACT

A displaceable spring seat (2) supporting one end of a vehicle suspension spring (S) is supported by a fluid pressure of an operation chamber (J). A screw pump (P) supplying a working fluid to the operation chamber (J) includes a pump chamber (L) defined within a cylinder (10) by a piston (11, a nut (13) formed integrally with the piston (11), and a screw shaft (14) screwed into the nut (13). A guide member (16) fixed to the cylinder (10) is fitted onto an outer circumference of the nut (13) or the piston (11) such that when the screw shaft (14) is driven to rotate, the piston (11) is fed via the nut (13). The guide member (16) formed from a non-metallic, low-friction material, reduces a driving resistance of the piston (11) and improves a durability of a screw portion between the nut (13) and the screw shaft (14).

12 Claims, 8 Drawing Sheets

U.S. PATENT DOCUMENTS

| | | | | |
|---|---|---|---|---|
| 4,830,395 | A | * | 5/1989 | Foley .................... 280/124.162 |
| 5,009,451 | A | * | 4/1991 | Hayashi et al. ............ 280/6.157 |
| 5,086,866 | A | * | 2/1992 | Banjo et al. .................. 180/219 |
| 5,181,696 | A | * | 1/1993 | Abe .......................... 267/64.17 |
| 5,348,112 | A | * | 9/1994 | Vaillancourt ................ 180/227 |
| 5,937,734 | A | | 8/1999 | Stiefel et al. |
| 7,237,780 | B2 | * | 7/2007 | Ohki .......................... 280/6.157 |
| 7,967,117 | B2 | * | 6/2011 | Abe ........................... 188/299.1 |
| 7,976,030 | B2 | * | 7/2011 | Michel ....................... 280/6.157 |
| 8,047,340 | B2 | * | 11/2011 | Abe ............................ 188/266.6 |
| 8,109,371 | B2 | * | 2/2012 | Kondo et al. .............. 188/266.3 |
| 8,205,864 | B2 | * | 6/2012 | Michel ........................... 267/218 |

FOREIGN PATENT DOCUMENTS

| | | |
|---|---|---|
| JP | 2005-280514 A | 10/2005 |
| JP | 2007-147016 A | 6/2007 |

\* cited by examiner

VEHICLE HEIGHT ADJUSTING DEVICE

TECHNICAL FIELD OF THE INVENTION

This invention relates to a vehicle height adjusting device for adjusting a height of a vehicle.

RELATED ART

JP2001-088528 A, published by the Japan Patent Office in 2001, discloses a vehicle height adjusting device for a vehicle.

The vehicle height adjusting device is applied to a suspension system constituted by a hydraulic shock absorber interposed between an axle and a vehicle body of the vehicle and a suspension spring disposed on an outer circumference of the hydraulic shock absorber. A spring seat that supports one end of the suspension spring is fitted to the outer circumference of the hydraulic shock absorber to be capable of sliding in an axial direction, and a support position of the spring seat is varied by a pressure of an operation chamber formed on the outer circumference of the hydraulic shock absorber. Oil pressure is supplied to the operation chamber from a screw pump provided on the outside of the hydraulic shock absorber.

The screw pump includes a cylinder and a piston accommodated in the cylinder, and a pump chamber is defined within the cylinder by the piston. The pump chamber communicates with the operation chamber via a pipe. The piston is driven in an axial direction of the cylinder via a screw shaft that is driven to rotate by an electric motor and a nut that is screwed onto the screw shaft and prevented from rotating relative to the cylinder. When the electric motor rotates the screw shaft, the nut displaces in the axial direction, causing the piston supported by the nut to displace in the axial direction relative to the cylinder, and as a result, the pump chamber is compressed.

When working oil ejected from the pump chamber is supplied to the operation chamber, the operation chamber is enlarged, causing the spring seat to displace in an orientation for compressing the suspension spring. The vehicle height of the vehicle is increased by this displacement of the spring seat. When the piston of the screw pump enlarges the pump chamber, on the other hand, working oil in the operation chamber is caused to flow into the enlarged pump chamber by a spring load of the suspension spring, and therefore the spring seat displaces in an orientation for expanding the suspension spring. As a result, the vehicle height decreases.

SUMMARY OF THE INVENTION

In this screw pump, the nut is constituted by an injection-molded plastic material. An arm that projects sideways is formed integrally with the nut. By inserting the arm into a slit formed in the cylinder in the axial direction, the nut is prevented from rotating. Accordingly, the nut screwed onto the screw shaft is displaced only in the axial direction when the screw shaft rotates.

The nut is preferably formed from a plastic material to suppress frictional resistance occurring when the arm displaces within the slit and reduce a load and an energy consumption of the electric motor for driving the nut in the axial direction.

Meanwhile, a compressive force generated by the spring load of the suspension spring permanently acts on the operation chamber. The pump chamber communicates with the operation chamber at all times, and therefore an axial direction force based on a vehicle body weight acts on the nut via the piston at all times. As the vehicle travels, the vehicle body oscillates vertically such that the suspension spring is compressed and expanded repeatedly. As a result, a maximum axial direction force acting on the nut greatly exceeds the axial direction force based on the vehicle body weight. This maximum axial direction force acts as a shearing force on a screw portion between the nut and the screw shaft. In the vehicle height adjusting device according to the prior art, in which the nut is constituted by a plastic material, a thread of the nut may be damaged by the shearing force.

It is therefore an object of this invention to improve the durability of a screw portion between a nut and a screw shaft applied to a screw pump of a vehicle height adjusting device with respect to a shearing force.

To achieve this object, this invention provides a vehicle height adjusting device for adjusting a height of a vehicle, comprising a spring seat that supports one end of a suspension spring of the vehicle, an operation chamber that is filled with a fluid and supports the spring seat using fluid pressure, and a screw pump that supplies a working fluid to the operation chamber.

The screw pump comprises a cylinder, a piston that slides on an inner circumference of the cylinder, a pump chamber that is defined within the cylinder by the piston and communicates with the operation chamber, a metallic nut formed integrally with the piston, the nut having a female screw on an inner circumference thereof, a screw shaft that is driven to rotate by a motive force, the screw shaft having a male screw engaged with the female screw, and a guide member made of a non-metallic, low-friction material, which is fixed to the cylinder and fitted onto an outer circumference of the nut or the piston to guide the nut or the piston in an axial direction while preventing the nut from rotating.

The details as well as other features and advantages of this invention are set forth in the remainder of the specification and are shown in the accompanying drawings.

DESCRIPTION OF THE PREFERRED EMBODIMENTS

Figure 1:
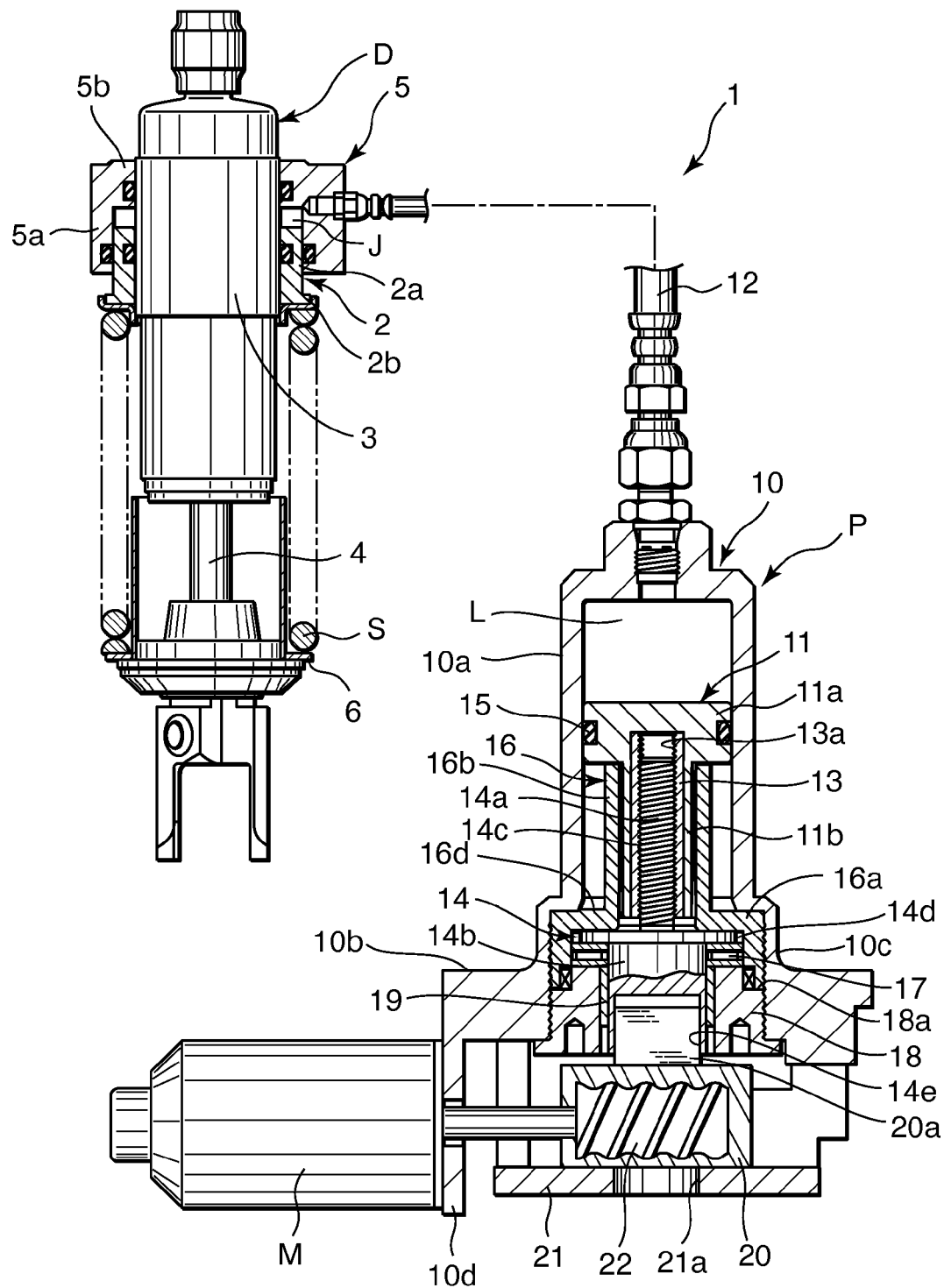
FIG. 1 is a longitudinal sectional view of a vehicle height adjusting device according to a first embodiment of this invention.

Referring to FIG. 1 of the drawings, a vehicle height adjusting device 1 is applied to a vehicle suspension device provided in a motorcycle and constituted by a suspension spring S interposed between a vehicle body and a swing arm supporting a rear wheel axle, and a hydraulic shock absorber D. The suspension spring S is disposed on the outside of the hydraulic shock absorber D. The hydraulic shock absorber D generates a damping force relative to expansion and contraction between an outer shell 3 and a rod 4. A base end of the outer shell 3, or in other words an upper end of the figure, is latched to the vehicle body, and a tip end of the rod 4, or in other words a lower end in the figure, is latched to the swing arm.

One end of the suspension spring S is supported by a spring seat 6 fixed to the tip end of the rod 4 of the hydraulic shock absorber D.

The vehicle height adjusting device includes a spring seat 2 that supports the other end of the suspension spring 2, an operation chamber J that applies oil pressure to the spring seat 2, and a screw pump P that supplies working oil to the operation chamber J.

An outer circumference of the base end portion of the outer shell 3 is covered by a housing 5. The housing 5 includes a tube body 5a that covers the outer shell 3 with a predetermined gap, and a base portion 5b that projects from an upper end of the tube body 5a toward an inner circumference side and is fixed to the outer circumference of the outer shell 3. The spring seat 2 is constituted by a tubular infiltrating portion 2a that is fitted to the outer circumference of the outer shell 3 of the hydraulic shock absorber D to be free to slide and infiltrates the inside of the housing 5, and an annular seat portion 2b that is provided on a lower end of the infiltrating portion 2a to support an upper end of the suspension spring S. The operation chamber J is formed inside the housing 5 to face an upper end of the infiltrating portion 2a.

The suspension spring S is sandwiched between the spring seats 2 and 6, and expands and contracts integrally with the hydraulic shock absorber D. The suspension spring S exerts an expansion direction load on the hydraulic shock absorber D at all times. As a result, a compressive force based on a spring load of the suspension spring S acts on the operation chamber J at all times.

When working oil is supplied to the operation chamber J from the screw pump P, a volume of the operation chamber J increases, causing the spring seat 2 to move downward in the figure. As a result, an interval between the vehicle body and the swing arm is widened such that the vehicle height of the motorcycle increases. When working oil is recirculated to the screw pump P from the operation chamber J, the operation chamber J is caused to contract by the spring load of the suspension spring S, and therefore the spring seat 2 moves upward in the figure. As a result, the interval between the vehicle body and the swing arm narrows such that the vehicle height of the motorcycle decreases.

The screw pump P includes a cylinder 10, and a resin piston 11 accommodated in the cylinder 10 to be free to slide. A pump chamber L is defined within the cylinder 10 so as to face the piston 11.

To drive the piston 11, the screw pump P includes a feed screw mechanism constituted by a metallic tubular nut 13 formed with a female screw 13a on an inner circumference thereof and a screw shaft 14 formed with a male screw 14a screwed into the female screw 13a, and an electric motor M that drives the screw shaft 14 to rotate.

The cylinder 10 includes a cylinder main body 10a, a bottom portion of which faces upward, a flange 10b that extends outwardly in a radial direction from an opening portion on a lower end of the cylinder main body 10a, and a bracket 10d formed on an edge portion of the flange 10b. An enlarged diameter portion 10c having a larger diameter than the cylinder main body 10a is formed in the vicinity of an opening end of the cylinder main body 10a. A female screw is formed over an entire length of an inner circumference of the enlarged diameter portion 10c.

Figure 2:
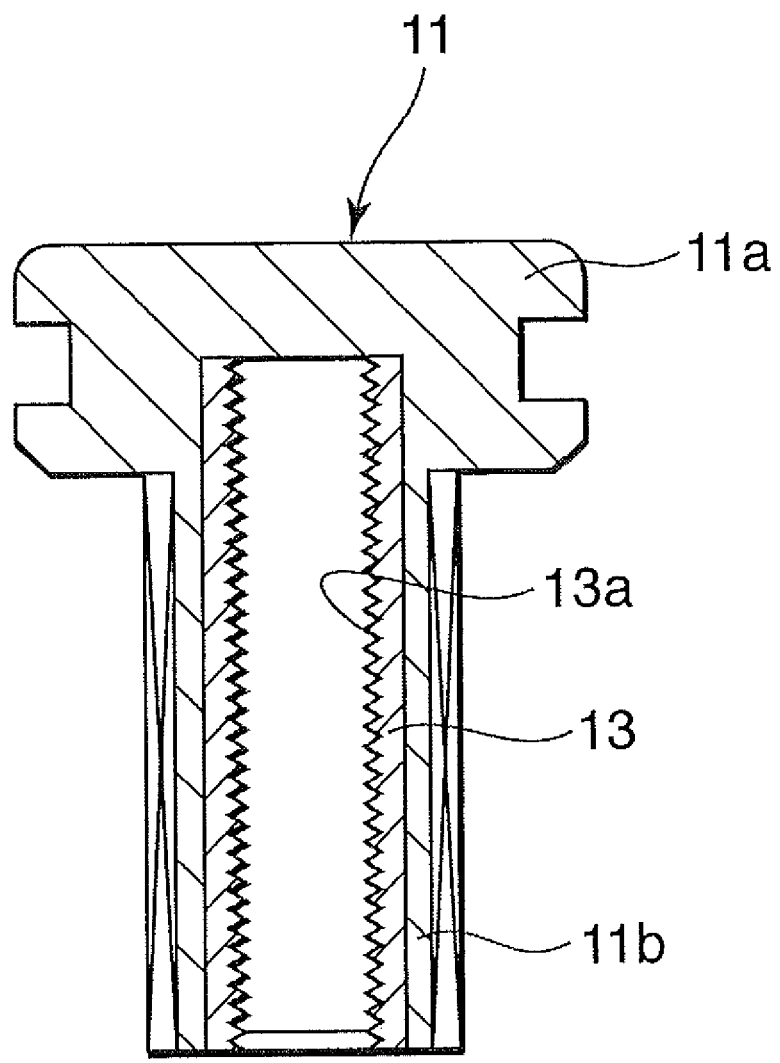
FIG. 2 is an enlarged longitudinal sectional view of a piston according to the first embodiment of this invention.

Referring to FIG. 2, the piston 11 includes a piston main body 11a, and a tube portion 11b that extends from the piston main body 11a in an opposite direction to the pump chamber L. The piston main body 11a and the tube portion 11b are formed integrally from resin.

The nut 13 is fitted to an inner circumference of the tube portion 11b. A fitting portion therebetween, or in other words an outer circumference of the nut 13 and the inner circumference of the tube portion 11b, is formed with a hexagonal cross-section. It should be noted, however, that the cross-section of the fitting portion is not limited to a hexagonal shape, and any shape other than a circular shape may be employed.

Referring back to FIG. 1, a resin guide member 16 covering the outer circumference of the tube portion 11b is fixed to the cylinder 10. The guide member 16 is constituted by a large diameter tube 16a that is formed with a male screw on an outer circumference thereof and screwed into the inner circumference of the enlarged diameter portion 10c, a guide tube 16b extending upward from the large diameter tube 16a, and a step 16d connecting the large diameter tube 16a and the guide tube 16b. An inner circumference of the large diameter tube 16a is formed with a cross-section taking a shape other than a circular shape, for example a hexagonal shape. By screwing the male screw of the large diameter tube 16a into the female screw on the enlarged diameter portion 10c of the cylinder 10 using a jig that fits the shape of the inner circumference of the large diameter tube 16a, the guide member 16 is fixed to the cylinder 10.

The tube portion 11b of the piston 11 slides on an inner circumference of the guide tube 16b. To prevent relative rotation between the tube portion 11b and the guide tube 16b, a fitting portion therebetween has a transverse section that takes a shape other than a circular shape, for example a hexagonal shape. The guide tube 16b supports the piston 11 to be capable of displacing in an axial direction relative to the cylinder 10 and incapable of rotating relative thereto.

By using the guide member 16 to prevent the tube portion 11b of the piston 11 from rotating relative to the cylinder 10 in this manner, the nut 13 is also prevented from rotating relative to the cylinder 10. As a result, the piston 11 and the nut 13 are permitted only to displace relative to the cylinder 10 in the axial direction, or in other words a vertical direction of the figure.

It should be noted that the outer circumference of the tube portion 11b and the inner circumference of the guide tube 16b do not have to be fitted together over their entire circumferences in order to prevent the tube portion 11b from rotating relative to the guide member 16. For example, a key or a key groove may be formed in the tube portion 11b and a key or a key groove may be formed in the guide tube 16b so that rotation is prevented by engagement between the key and the key groove.

On the other hand, when the guide tube 16b slides over the entire circumference of the tube portion 11b, the tube portion 11b can be positioned in the radial direction, and wobbling and backlash can be suppressed in a shaft of the tube portion 11b supporting the nut 13. Accordingly, the piston 11 can displace smoothly in the axial direction relative to the cylinder 10.

The guide tube 16b need not have an identical cross-section over its entire length. For example, the inner circumference of a tip end portion of the guide tube 16b may be formed with a hexagonal cross-section while the inner circumference of a base end portion is formed with a circular cross-section which is larger than the hexagonal shape. By shortening the length of the fitting portion in this manner, frictional resistance generated when the tube portion 11b displaces in the axial direction relative to the guide member 16 can be reduced.

The pump chamber L communicates with the operation chamber J via a conduit 12 connected to a crown portion of the cylinder main body 10a. A seal ring 15 is attached to an outer circumference of the piston main body 11a. The seal ring 15 slides on the inner circumference of the cylinder main body 10a, thereby preventing the working oil in the pump chamber L from leaking below the piston 11.

The screw shaft 14 includes a base portion 14b, a shaft portion 14c that infiltrates the nut 13 from the base portion 14b, a flange 14d that extends radially outward in a disc shape from the base portion 14b, and a hole portion 14e formed in a lower end of the base portion 14b. The aforementioned male screw 14a is formed on a tip end outer circumference of the shaft portion 14c. An inner circumference of the hole portion 14e is formed with a non-circular cross-section. The flange 14d restricts upward displacement of the screw shaft 14 by contacting the step 16d of the guide member 16. A lid 18 is screwed into the inner circumference of the enlarged diameter portion 10c of the cylinder 10 from below. A thrust bearing 17 that supports the screw shaft 14 such that the screw shaft 14 is free to rotate in a horizontal direction and oriented upward in the axial direction is interposed between the lid 18 and the flange 14d. The base portion 14b penetrates the lid 18 such that the hole portion 14e is exposed downward. A diameter of the flange 14d is set such that rotation of the flange 14d inside the large diameter tube 16a is not impaired.

To assemble the screw pump P, the piston 11, nut 13, and guide member 16 are fitted into the cylinder 10, whereupon the screw shaft 14 is screwed into the nut 13 and the screw shaft 14 is rotated until the flange 14d contacts the step 16d. In this state, the lid 18 is screwed into the inner circumference of the enlarged diameter portion 10c of the cylinder 10 such that the thrust bearing 17 is sandwiched between the flange 14d and a tip end of the lid 18.

A tubular bush 19 is attached to the lid 18 in advance. The bush 19 slides on the outer circumference of the base portion 14b of the screw shaft 14, thereby supporting the screw shaft 14 rotatably on the cylinder 10 while preventing the screw shaft 14 from wobbling in the radial direction.

A step 18a is formed in advance on an outer circumference of an upper end of the lid 18. When the lid 18 is screwed into the inner circumference of the enlarged diameter portion 10c of the cylinder 10, the step 18a contacts a lower end of the guide member 16 that is likewise screwed into the enlarged diameter portion 10c. In other words, the guide member 16 and the lid 18 function as a double nut, thereby preventing loosening of the guide member 16 with respect to the cylinder 10 and ensuring that the guide member 16 does not rotate relative to the cylinder 10 integrally with the piston 11.

One end of a shaft 20a of a worm wheel 20 is fitted into the hole portion 14e. The one end of the shaft 20a has an identical sectional shape to the inner circumference of the hole portion 14e, and the shaft 20a, the one end of which is fitted to the hole portion 14e, rotates relative to the cylinder 10 integrally with the worm wheel 20 and the screw shaft 14.

Another end of the shaft 20a extends below the worm wheel 20 to infiltrate a hole portion 21a of a gear holder 21 annexed to the flange 10b of the cylinder 10. The worm wheel 20 is supported in the cylinder 10 by the gear holder 21 to be free to rotate.

A worm 22 is meshed to the worm wheel 20. The worm 22 is coupled to the electric motor M fixed to the bracket 10d, and rotates the worm wheel 20 in accordance with rotation of the electric motor M. If there is no need to reduce the rotation of the electric motor M before transmitting the rotation to the screw shaft 14, the worm 22 and the worm wheel 20 may be omitted such that the screw shaft 14 is driven to rotate directly by the electric motor M. Even if rotation reduction is required, a reduction mechanism constituted by any other type of gear may be applied instead of the reduction mechanism constituted by the worm 22 and the worm wheel 20.

When the electric motor M is driven, the rotation of the electric motor M is reduced by the worm 22 and the worm wheel 20 and then transmitted to the screw shaft 14. When the screw shaft 14 rotates, the feed screw mechanism constituted by the female screw 13a and the male screw 14a displaces the piston 11 in the axial direction relative to the cylinder 10.

When the piston 11 displaces upward in the figure, the pump chamber L is compressed such that an amount of working oil corresponding to a reduction in the volume of the pump chamber L flows into the operation chamber J from the screw pump P, and as a result, the vehicle height increases. When the piston 11 displaces downward in the figure, the pump chamber L expands such that working oil flows out of the operation chamber J, which is compressed by the spring load of the suspension spring S, into the pump chamber L of the screw pump P, and as a result, the vehicle height decreases.

The tube portion 11b of the piston 11 is prevented from rotating by the guide member 16, and the nut 13 is prevented from rotating relative to the tube portion 11b. Therefore, when the electric motor M is driven to rotate the screw shaft 14, the nut 13 is fed without rotating so as to displace in the axial direction and the piston 11 displaces in accordance therewith.

A torque of the screw shaft 14 is transmitted to the piston 11, causing friction between the inner circumference of the guide tube 16b of the guide member 16 and the outer circumference of the tube portion 11b of the piston 11, and as a result, frictional resistance is generated between the guide member 16 and the piston 11. In the vehicle height adjusting device 1, the piston 11 and the guide member 16 are both formed from low-friction resin, and therefore the amount of frictional resistance generated between the guide member 16 and the piston 11 is small. Accordingly, reductions in a load of the electric motor M and an amount of energy consumed by the electric motor M to drive the piston 11 can be achieved. Furthermore, an output torque required of the electric motor M decreases, and therefore a favorable effect is obtained in terms of a size reduction in the electric motor M.

The female screw 13a is formed on the inner circumference of the metallic nut 13, and therefore sufficient strength is secured. Even when an excessive compressive force is exerted on the pump chamber L by the spring load of the suspension spring S such that a large shearing force acts on a thread of a meshed portion between the female screw 13a of the nut 13 and the male screw 14a of the screw shaft 14, there is no danger that the screw thread of the female screw 13a will be crushed.

Further, the entire piston 11 is made of resin, and therefore a collision between metal components does not occur even if the piston main body 11a of the piston 11 comes into contact with the crown portion of the cylinder main body 10a of the cylinder 10 or the upper end of the guide member 16. Moreover, even if the piston 11 collides with the cylinder 10 or the guide member 16 and stops, an impact generated by the collision is mitigated by the resin, and therefore a collision noise can be suppressed.

Figure 3:
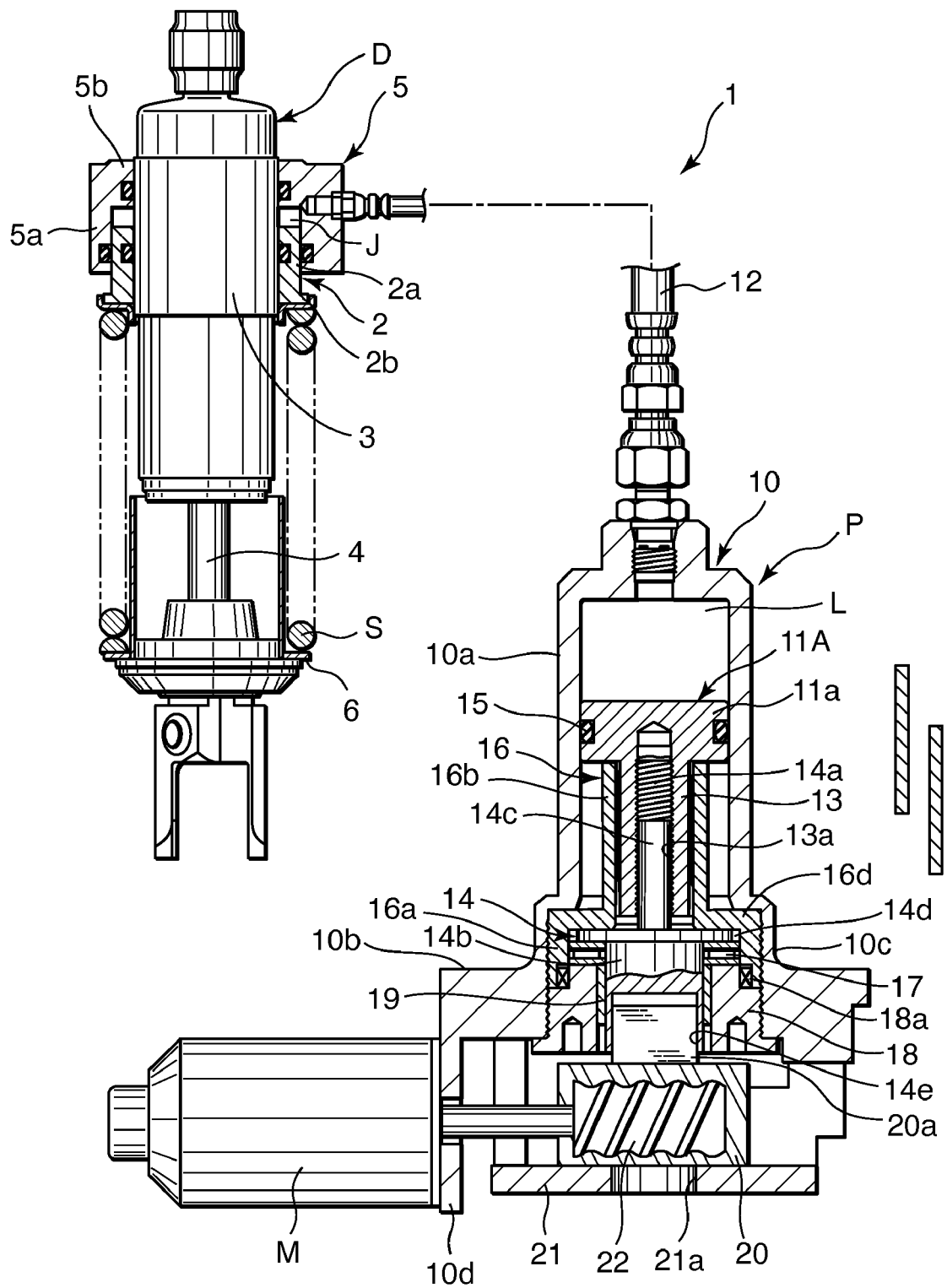
FIG. 3 is a longitudinal sectional view of a vehicle height adjusting device according to a second embodiment of this invention.
Figure 4:
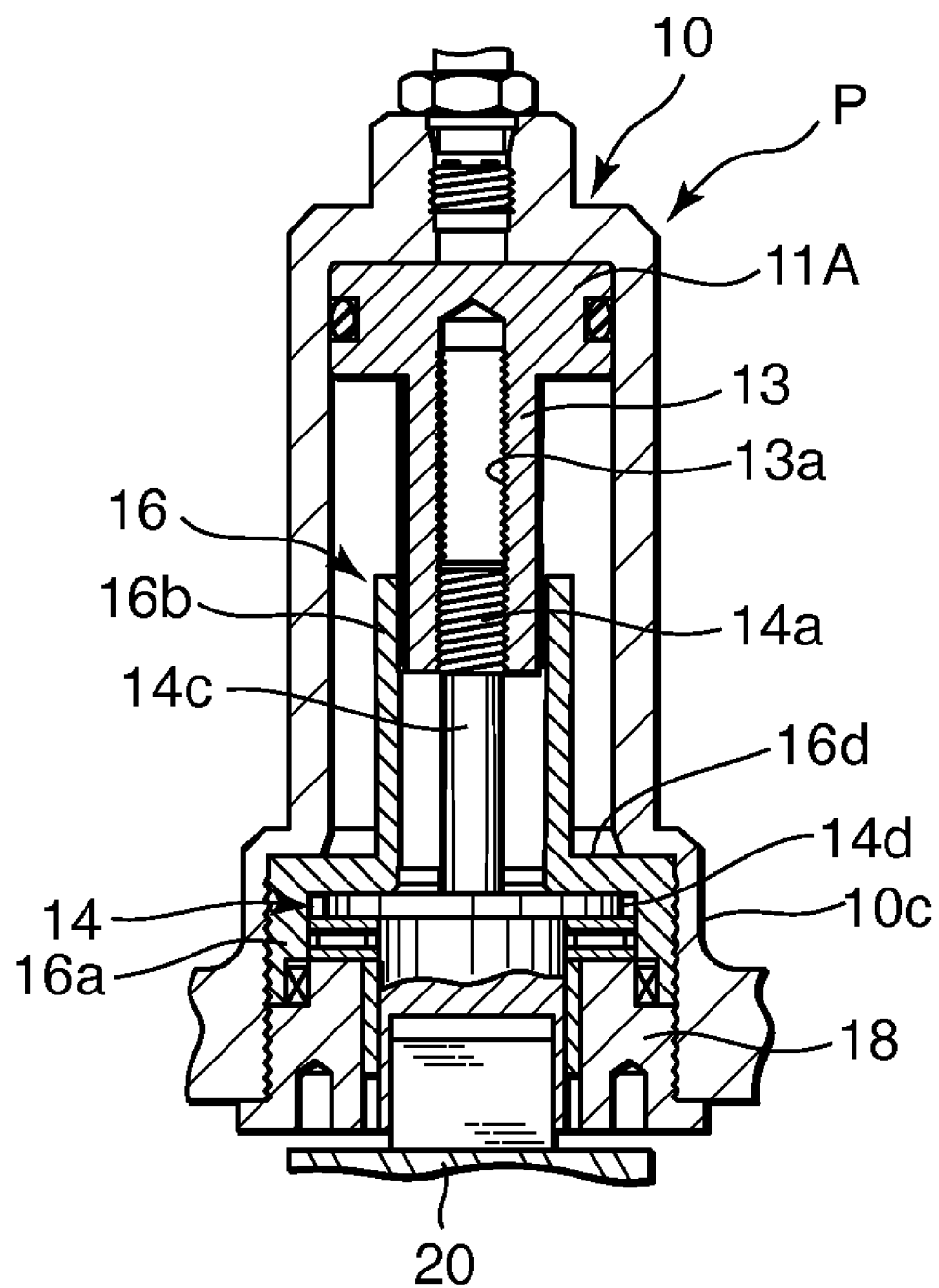
FIG. 4 is a longitudinal sectional view of main parts of a screw pump according to the second embodiment of this invention.

Referring to FIGS. 3 and 4, a second embodiment of this invention will be described.

Referring to FIG. 3, the vehicle height adjusting device 1 according to this embodiment differs from the first embodiment in the constitution of a part of the screw pump P. Identical constitutional components to the first embodiment have been allocated identical reference symbols and description thereof has been omitted.

The screw pump P according to this embodiment employs a piston 11A instead of the piston 11. The piston 11A is made of metal and structured such that the nut 13 is formed integrally with the bottom of the piston main body 11a. The screw shaft 14, which is formed identically to that of the first embodiment, is screwed into the inner circumference of the nut 13.

The nut 13 is fitted into the inner circumference of the guide tube 16b of the resin guide member 16. A cross-section of a fitting portion takes a shape obtained by cutting away both ends of a circle to form two parallel straight lines, for example. However, the cross-section of the fitting portion may take any non-circular shape. With respect to the fitting portion, the inner circumference of the guide tube 16b does not necessarily have to have an identical sectional shape to the outer circumference of the nut 13 as long as the guide tube 16b is fitted in a manner that the guide tube 16b prevents the nut 13 from rotating. However, when the inner circumference of the guide tube 16b has an identical sectional shape to the outer circumference of the nut 13, radial direction displacement of the nut 13 is restricted in relation to all directions, and therefore axial displacement of the nut 13 is stabilized.

In this embodiment, the resin guide member 16 guides axial direction displacement of the metallic nut 13 while preventing the nut 13 from rotating. Therefore, similarly to the first embodiment, frictional resistance applied to the displacement of the piston 11A by the guide member 16 can be suppressed.

Furthermore, in this embodiment, a number of threads on the male screw 14a of the screw shaft 14 is determined as follows.

In this embodiment, the male screw 14a is formed only on the tip end outer circumference of the shaft portion 14c of the screw shaft 14. The female screw 13a, on the other hand, is formed over the entire length of the nut 13. Therefore the number of threads on the male screw 14a is smaller than the number of threads on the female screw 13a of the nut 13, and the number of threads on the screw portion between the female screw 13a of the nut 13 and the male screw 14a of the screw shaft 14 is determined by the number of threads on the male screw 14a.

Hence, in this embodiment, the number of threads on the male screw 14a is set at a minimum number for satisfying a strength required to withstand the shearing force that is exerted on the screw portion between the female screw 13a and the male screw 14a by the internal pressure of the pump chamber L. More specifically, the minimum number of threads for withstanding a maximum shearing force exerted on the screw portion is calculated from a shearing strength of a single thread, which is determined according to the maximum shearing force and the material, shape and dimensions of the thread. The number of threads on the male screw 14a is then set to equal the minimum number determined in this manner.

By setting the number of threads on the male screw 14a in this manner, relative rotation resistance between the screw shaft 14 and the nut 13 can be minimized.

Referring to FIG. 4, when the electric motor M is driven to rotate the screw shaft 14, the nut 13 is fed without being rotated, and as a result, the piston 11A displaces axially in a direction for compressing the pump chamber L. The figure shows a state in which the piston 11A contacts the bottom portion of the cylinder 10 such that the pump chamber L is in a maximally compressed condition.

A formation position of the male screw 14a on the shaft portion 14c is selected in advance so that in this state, all of the threads on the male screw 14a of the screw shaft 14 mesh with the female screw 13a on the nut 13. By setting the formation position in this manner, the number of threads on the screw portion between the male screw 14a and the female screw 13a does not fall below the minimum number, irrespective of a stroke position of the piston 11A. Hence, according to this embodiment, relative rotation resistance between the screw shaft 14 and the nut 13 is suppressed to a minimum while maintaining sufficient shearing resistance in the screw portion. As a result, the load of the electric motor M can be reduced, and the amount of energy consumed by the electric motor M to drive the piston 11A can be reduced. Furthermore, the output torque required of the electric motor M decreases, and therefore a favorable effect is obtained in terms of reducing the size of the electric motor M.

Figure 5:
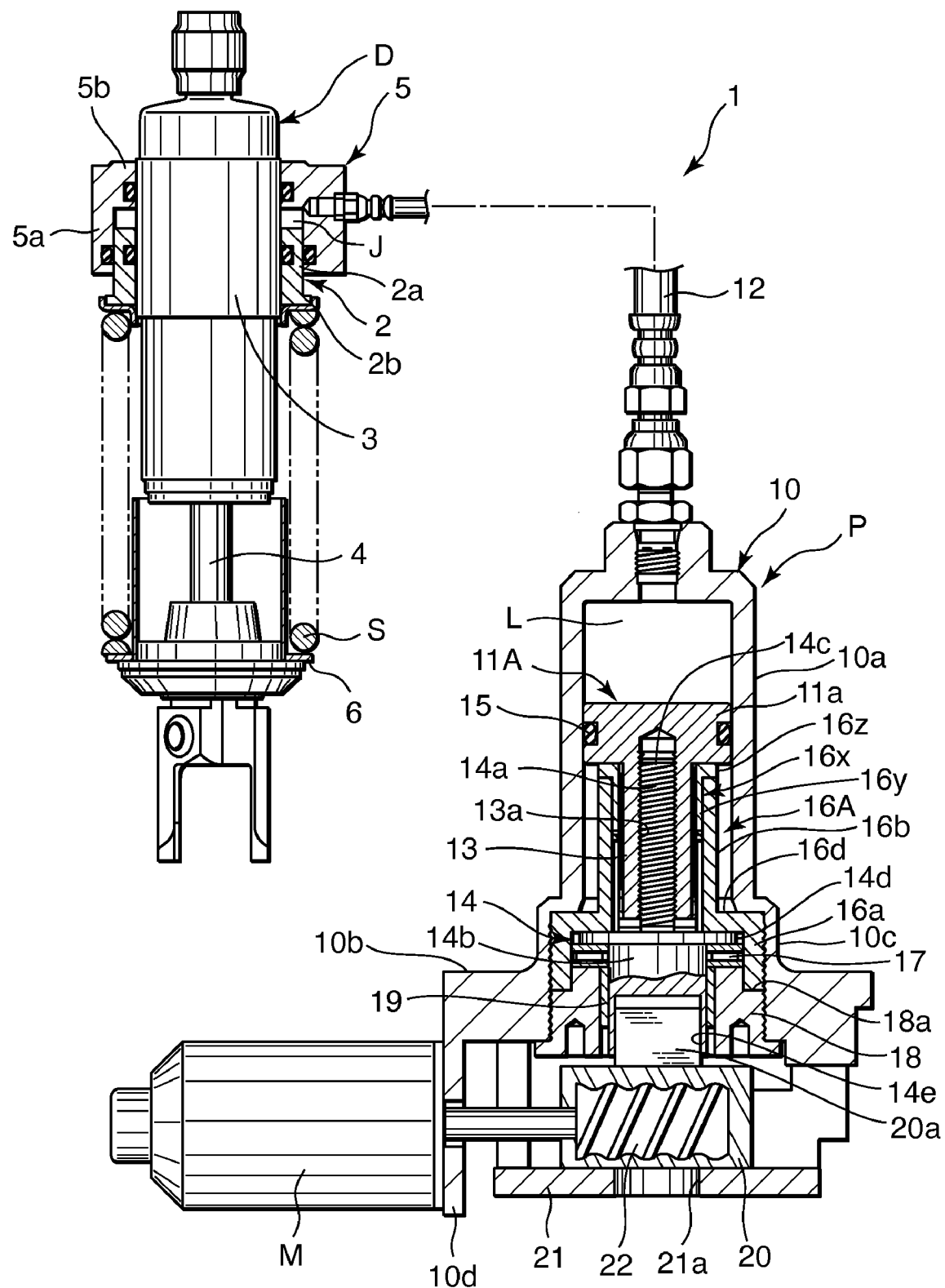
FIG. 5 is a longitudinal sectional view of a vehicle height adjusting device according to a third embodiment of this invention.
Figure 6:
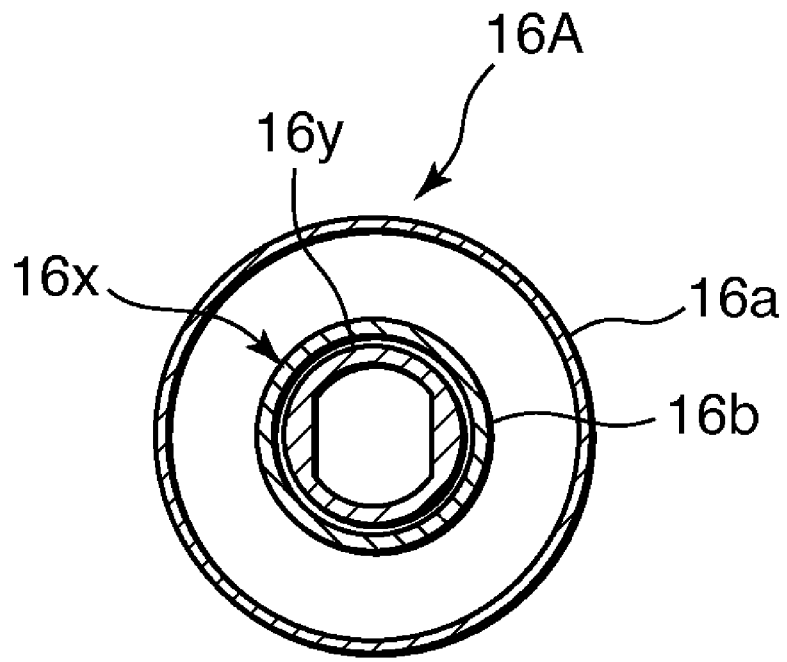
FIG. 6 is a cross-sectional view of main parts of a screw pump according to the third embodiment of this invention.

Referring to FIGS. 5 and 6, a third embodiment of this invention will be described.

This embodiment differs from the second embodiment in that a guide member 16A is employed instead of the guide member 16. Identical constitutional component to the second embodiment have been allocated identical reference symbols, and description thereof has been omitted.

In this embodiment, similarly to the second embodiment, the metallic piston 11A in which the piston main body 11a and the nut 13 are integrated is used.

In this embodiment, the guide tube 16b of the guide member 16A does not slide on the outer circumference of the nut 13, and instead, a low-friction resin guide 16x screwed into the upper end inner circumference of the guide tube 16b slides on the outer circumference of the nut 13. The guide 16x includes a tubular member 16y screwed into the upper end inner circumference of the guide tube 16b, and a flange 16z that projects radially outward from the tubular member 16y above the guide tube 16b. To prevent relative rotation between the guide 16x and the guide tube 16b, a screw portion between the tubular member 16y and the upper end inner circumference of the guide tube 16b is fixed using an adhesive. Instead of screwing the tubular member 16y to the upper end inner circumference of the guide tube 16b, the tubular member 16y may be press-fitted into the upper end inner circumference of the guide tube 16b.

An inner circumference of the tubular member 16y has a non-circular cross-section, and is fitted onto the outer circumference of the nut 13. The cross-section of the inner circumference of the tubular member 16y is formed with an identical shape to the cross-section of the outer circumference of the nut 13. The flange 16z positions the tubular member 16y when the tubular member 16y is screwed into the upper end inner circumference of the guide tube 16b by causing the tubular member 16y to contact the upper end of the guide tube 16b. The flange 16z also serves as a damping member by contacting the descending piston 11. It should be noted that the inner circumference of the guide tube 16b is formed with a larger diameter than that of the second embodiment to avoid contact with the outer circumference of the nut 13.

In this embodiment, a sliding distance between the nut 13 and the guide member 16A is shorter than that of the second embodiment, and therefore the frictional resistance applied to displacement of the piston 11A by the guide member 16A can be suppressed even further.

In this embodiment, the guide 16x is made of resin, but the large diameter tube 16a, guide tube 16b, and step 16d of the guide member 16A may be made of resin or metal.

Figure 7:
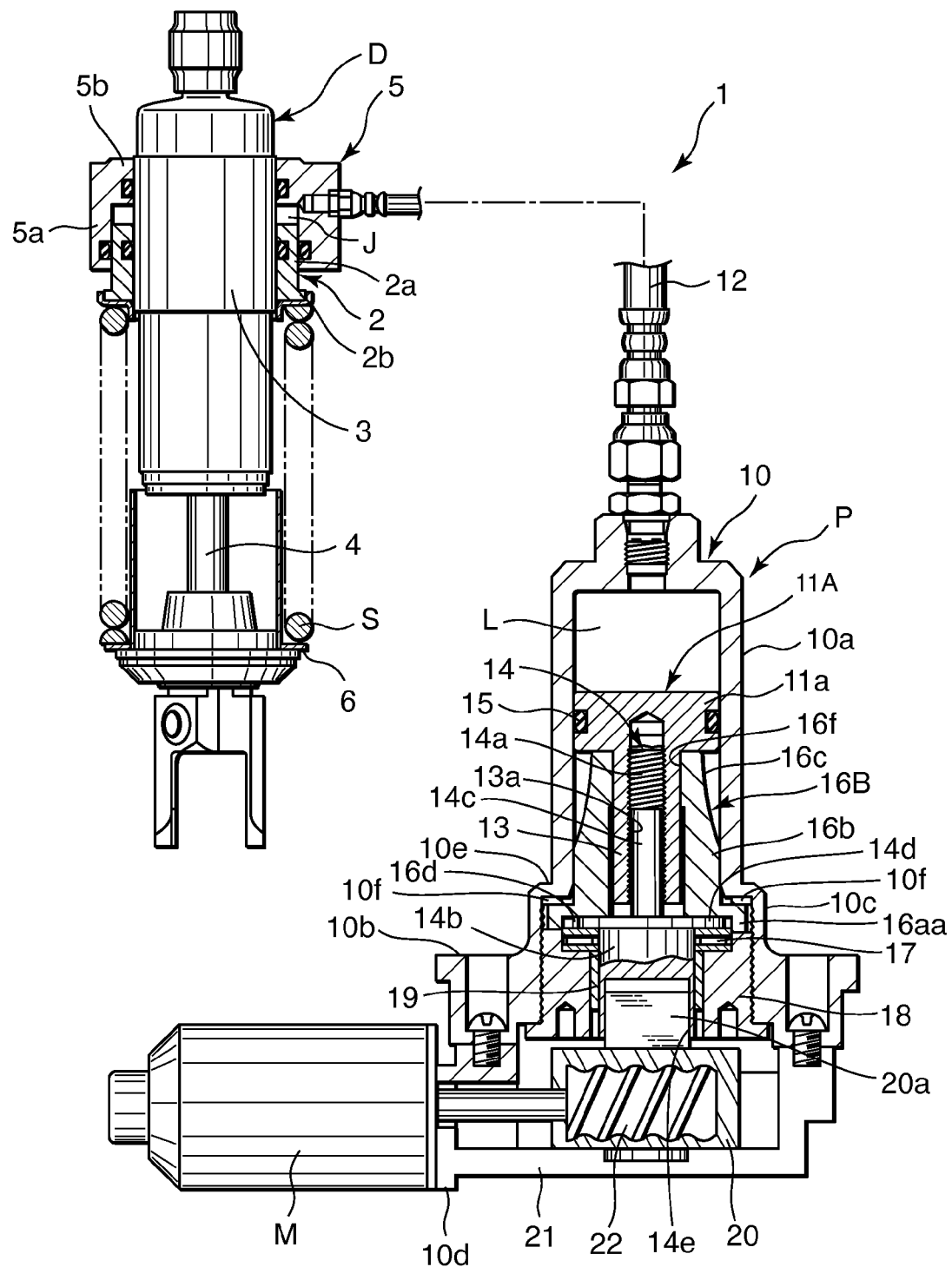
FIG. 7 is a longitudinal sectional view of a vehicle height adjusting device according to a fourth embodiment of this invention.
Figure 8:
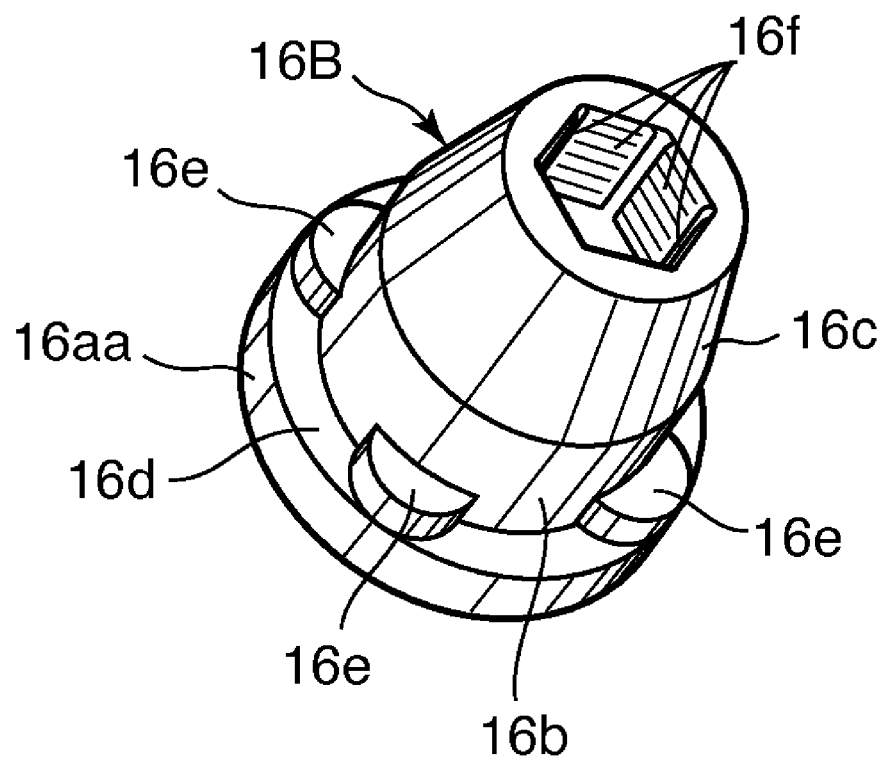
FIG. 8 is a perspective view of a guide member according to the fourth embodiment of this invention.

Referring to FIGS. 7 and 8, a fourth embodiment of this invention will be described.

This embodiment differs from the second embodiment in that a guide member 16B is employed instead of the guide member 16. Identical constitutional component to the second embodiment have been allocated identical reference symbols, and description thereof has been omitted.

In this embodiment, similarly to the second embodiment, the metallic piston 11A in which the piston main body 11a and the nut 13 are integrated is used.

In this embodiment, the single resin guide member 16B prevents the nut 13 from rotating and guides the nut 13 in the axial direction. An outer cross-section of the nut 13 is formed in a hexagonal shape.

Referring to FIG. 8, the guide member 16B includes a large diameter tube 16aa, the step 16d, the guide tube 16b, and a tapered portion 16c.

The large diameter tube 16aa differs from the large diameter tube 16a of the first to third embodiments in that a male screw is not formed on the outer circumference thereof and the diameter thereof is formed to be smaller than an inner diameter of the enlarged diameter portion 10c. Four upwardly oriented projections 16e are formed at equal angular intervals on the step 16d.

Referring to FIG. 7, four downwardly oriented projecting portions 10f are formed at angular intervals on a step 10e serving as an upper end of the enlarged diameter portion 10c of the cylinder 10. When the guide member 16B is inserted upwardly from the opening end of the cylinder 10 during the assembly process of the screw pump P, the four upwardly oriented projections 16e formed on the step 16d are fitted between the four projecting portions 10f formed in a downward orientation on the step 10e. In this state, the lid 18 is screwed into the enlarged diameter portion 10c, whereby the large diameter tube 16a is sandwiched between the tip end of the lid 18 and the step 10e of the cylinder 10, and as a result, the guide member 16 is fixed to the cylinder 10. A height of the projections 16e may be set to be greater than a height of the projecting portion 10f so that the guide member 16B is positioned in the axial direction when the projections 16e contact the step 10e.

Similarly to the first to third embodiments, the flange 14d of the screw shaft 14 is supported by the thrust bearing 17 inside the large diameter tube 16a to be free to rotate.

The diameter of the guide tube 16b is set such that the guide tube 16b can fit into the inner circumference of the cylinder main body 10a. As shown in FIG. 7, the diameter of the inner circumference of the guide tube 16b is formed to be larger than the outer diameter of the nut 13. The tapered portion 16c is formed such that an outer diameter thereof decreases gradually upward from the upper end of the guide tube 16b. As shown in the figure, when the piston 11A is in a maximum downward displacement position, a tip end of the tapered portion 16c contacts the piston 11, thereby restricting further downward displacement of the piston 11A.

An inner circumferential surface 16f of the tapered portion 16c is formed with an identical hexagonal shape to the outer shape of the nut 13 so that the tapered portion 16c slides on the outer circumference of the nut 13.

In this embodiment, the outer circumference of the nut 13 slides only on the inner circumferential surface 16f of the tapered portion 16c. Therefore, the sliding distance between the nut 13 and the guide member 16B is shorter than the sliding distance between the nut 13 and the guide member 16A of the second embodiment, and as a result, the frictional resistance applied to displacement of the piston 11A by the guide member 16B can be suppressed even further.

Further, in this embodiment, the guide tube 16b is fitted to the inner circumference of the cylinder main body 10a. Therefore, coaxiality is secured between the cylinder main body 10a, the piston 11A, the guide member 16B and the nut 13, and as a result, the piston 11A realizes a smooth sliding motion through the cylinder 10.

With respect to the above description, the contents of Tokugan 2008-326955, Tokugan 2008-326956, Tokugan 2008-326957 and Tokugan 2008-326958, with a filing date of Dec. 24, 2008 in Japan, are incorporated herein by reference.

Although the invention has been described above with reference to certain embodiments, the invention is not limited to the embodiments described above. Modifications and variations of the embodiments described above will occur to those skilled in the art, within the scope of the claims.

For example, in the embodiments described above, the operation chamber J and the spring seat 2 are formed integrally with the hydraulic shock absorber D on the outer side of the outer shell 3 of the hydraulic shock absorber D, but the operation chamber J and the spring seat 2 may be disposed independently of the hydraulic shock absorber D.

In the second to fourth embodiments, the metallic piston 11 in which the piston main body 11a and the nut 13 are formed integrally is used, but since the pressure of the pump chamber L acts on the piston main body 11a at all times, the piston main body 11a displaces integrally with the nut 13 at all times with respect to the axial direction. Accordingly, the piston main body 11a and the nut 13 may be provided separately. In this case, frictional resistance between the piston main body 11a and the cylinder 10 can be suppressed by forming the piston main body 11a from resin.

In the first, third and fourth embodiments, the number of threads on the screw portion between the male screw 14a of the screw shaft 14 and the female screw 13a of the nut 13 may be set equal to the minimum number of threads for withstanding the maximum shearing force, similarly to the second embodiment. In this case, relative rotation resistance between the screw shaft 14 and the nut 13 can be minimized while maintaining sufficient shearing resistance in the screw portion. As a result, further reductions in the load of the electric motor M and the amount of energy consumed by the electric motor M to drive the piston 11 can be achieved in the first, third and fourth embodiments. Moreover, the output torque required of the electric motor M decreases further, and therefore a favorable effect is obtained in terms of reducing the size of the electric motor M.

In each of the embodiments described above, the screw shaft 14 is driven by the electric motor M, but the screw shaft 14 may be driven by any rotating machine.

INDUSTRIAL APPLICABILITY

As described above, this vehicle height adjusting device is suitable for adjusting the vehicle height of a motorcycle, but may be applied to another vehicle.

The embodiments of this invention in which an exclusive property or privilege is claimed are defined as follows:

The invention claimed is:

1. A vehicle height adjusting device for adjusting a height of a vehicle, comprising:
    a spring seat that supports one end of a suspension spring of the vehicle;
    an operation chamber that is filled with a fluid and supports the spring seat using fluid pressure; and
    a screw pump that supplies a working fluid to the operation chamber, the screw pump comprising:
        a cylinder;
        a piston that slides on an inner circumference of the cylinder;
        a pump chamber that is defined within the cylinder by the piston and communicates with the operation chamber;
        a metallic nut formed integrally with or fixed to the piston, the nut having a female screw on an inner circumference thereof;
        a screw shaft that is driven to rotate by a motive force, the screw shaft having a male screw engaged with the female screw; and
        a guide member made of a non-metallic, low-friction material, which is fixed to the cylinder and fitted onto an outer circumference of the nut or the piston to guide the nut or the piston in an axial direction while preventing the nut from rotating.

2. The vehicle height adjusting device as defined in claim 1, wherein
    the piston is constituted by a resin material, and comprises a piston main body that slides on the inner circumference of the cylinder and a tube portion that extends from the piston main body in an opposite direction to the pump chamber,
    the nut is fixed to a center of the tube portion, and
    the guide member is constituted by a resin material and fitted into an outer circumference of the tube portion.

3. The vehicle height adjusting device as defined in claim 2, wherein an entire circumference of the guide member slides on the tube portion.

4. The vehicle height adjusting device as defined in claim 1, wherein
    the piston is constituted by a metallic material,
    the nut is formed integrally with the piston, and
    the guide member is constituted by a resin material and fitted to an outer circumference of the nut.

5. The vehicle height adjusting device as defined in claim 1, wherein a number of threads on a screw portion between the male screw and the female screw is set at a minimum number for satisfying a shearing strength required of the screw portion.

6. The vehicle height adjusting device as defined in claim 5, wherein the number of threads formed on either the male screw or the female screw is set to be equal to the minimum number.

7. The vehicle height adjusting device as defined in claim 1, wherein
    the piston is constituted by a metallic material,
    the nut is formed integrally with the piston, and
    the guide member comprises a guide tube having an inner diameter that does not interfere with displacement of the nut, and a resin guide that is fixed to the guide tube and slides on the outer circumference of the nut.

8. The vehicle height adjusting device as defined in claim 7, wherein the guide comprises a tubular member that slides on the outer circumference of the nut, and a flange formed on one end of the tubular member and interposed between the guide tube and the piston.

9. The vehicle height adjusting device as defined in claim 7, wherein an entire circumference of the tubular member slides on the tube portion.

10. The vehicle height adjusting device as defined in claim 1, wherein the screw shaft comprises a flange that restricts relative displacement between the screw shaft and the guide member in the axial direction by contacting the guide member.

11. The vehicle height adjusting device as defined in claim 10, wherein the cylinder comprises an enlarged diameter portion having an enlarged inner circumference diameter,
    the guide member comprises an axial direction projection, and
    the cylinder comprises a projecting portion that engages with the projection on an inner side of the enlarged diameter portion to prevent the guide member from rotating.

12. The vehicle height adjusting device as defined in claim 1, wherein the guide member comprises a guide tube that is fitted to the inner circumference of the cylinder, and a member that is formed as a continuation of a tip end of the guide tube and has an inner circumferential surface fitted to the outer circumference of the nut, and a diameter of the inner circumference of the guide tube is set to be larger than a shape of the outer circumference of the nut.

* * * * *